UNITED STATES PATENT OFFICE.

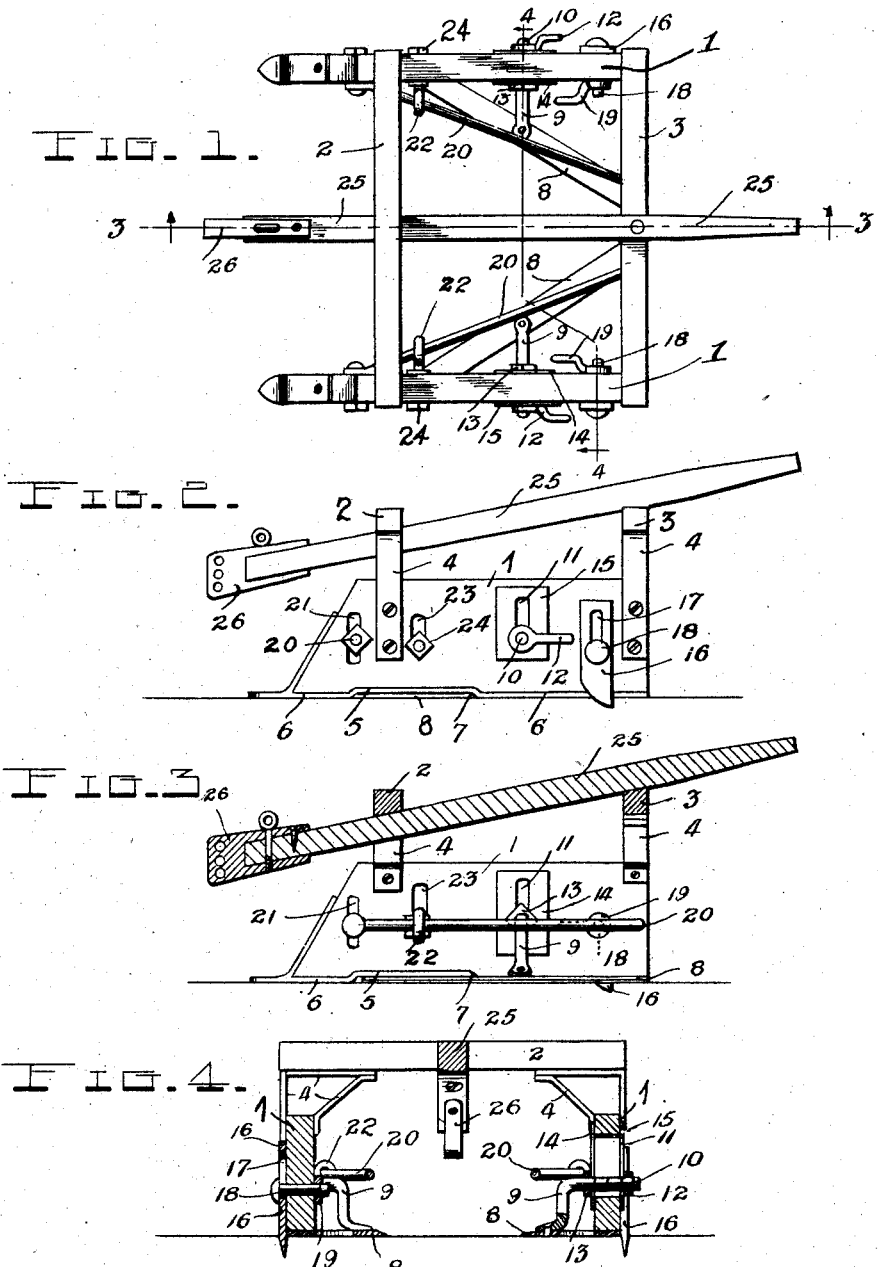

JOHN WESLEY BROWN, OF ARROYO GRANDE, CALIFORNIA.

BEAN-CUTTER.

No. 866,185.  Specification of Letters Patent.  Patented Sept. 17, 1907.

Application filed May 27, 1907. Serial No. 375,934.

*To all whom it may concern:*

Be it known that I, JOHN WESLEY BROWN, a citizen of the United States, residing at Arroyo Grande, in the county of San Luis Obispo and State of California, have invented certain new and useful Improvements in Bean-Cutters; and I do declare the following to be a full, clear, and exact description of the invention, such as will enable others skilled in the art to which it appertains to make and use the same.

My invention has relation to new and useful improvements in bean cutters, and has for its main object to provide an improved form of knives and guards, and means for adjusting the same either vertically or laterally.

With this and other objects in view that will readily appear as the nature of the invention is better understood, my invention consists of certain novel features of construction and combination of parts illustrated in the drawings and particularly pointed out in the specification and claims hereunto appended.

In the accompanying drawings,—Figure 1 is a top plan view of my invention; Fig. 2 is a side elevation; Fig. 3 is a longitudinal sectional view on the line 3—3 of Fig. 1; and Fig. 4 is a cross sectional view on the line 4—4 of Fig. 1, looking in the direction of the arrows.

The frame of my invention comprises two side pieces 1 connected near their front and rear ends by cross bars 2 and 3, respectively, and angular braces 4, secured at their lower ends to the outer sides of said side pieces and at their inner edges to the under sides of said cross bars. Each of said side bars 1 is provided in its under edge and near its front end with a longitudinal recess 5, and secured to the under edges of said side pieces 1 are longitudinal runners 6, having suitable upwardly extending bent portions 7, corresponding in length with and adapted to fit in the said longitudinal recesses of said side pieces 1.

The numeral 8 represents two oblique cutting knives, which are pivotally secured at their front ends to the under sides of the upwardly extending bent portions 7 of the runners 6, by suitable means. The rear ends of said knives are adjustably held in position by means of adjusting hangers 9 secured at their lower ends to the upper faces and near the centers of said cutting knives 8 and having horizontal outwardly extending threaded portions 10 adapted to work in vertical elongated slots 11 in said side pieces 1, adjacent said hangers and having disposed on their threaded portions wing nuts 12 for holding said adjusting supporters in position. Said adjusting hangers 9 may also be provided with suitable washers 13, which work on the threaded portions of the same and are adapted to be clamped against the inner faces of vertical bearing plates 14, secured to the inner sides of said side pieces 1 and having vertical elongated slots to correspond with the vertical elongated slots in said side pieces. Vertical bearing plates 15 having slots to correspond with the slots in said side pieces may be also secured to the outer sides of the same and serve as bearings for said wing nuts 12. When the rear ends of said cutting knives 8 are in their highest position the under sides of the same are preferably flush with the under sides of said runners, which feature is permitted by reason of the longitudinal recesses 5 in said side pieces, and the upwardly extending bent portions 7 of said runners 6. In this position said knives work on a level with the ground and do not plow up the dirt and cover up the bean vines, but if desired, may be lowered to run in the ground.

The numeral 16 represents two vertical retaining knives, which are adjustably secured by means of elongated slots 17 in their upper parts and bolts and wing nuts 18 and 19, respectively, to the outer sides and near the rear ends of said side pieces 1 of said frame. The lower ends of said retaining knives, 16, extend below the undersides of said longitudinal runners 6 and penetrate into the ground to prevent lateral displacement of the bean cutter when in use. The said elongated slots 17 in said retaining knives 16, permit them to be adjusted so that their lower ends may extend any suitable distance below the said runners, and thereby penetrate into the ground at any desired depth.

The numeral 20 represents two oblique, rearwardly extending guards, which are adjustably secured at their extreme front ends in vertical elongated slots 21 in and near the front ends of said side pieces by bolts, adapted to work through said vertical elongated slots 21, and having nuts disposed on their threaded ends. The rear ends of said oblique rearwardly extending guards 20 are held in position by means of supporting screw eyes 22, or other equivalent means, adapted to work in vertical elongated slots 23 in and near the front ends of said side pieces, rearward of said slots 21 and having washers on their threaded ends adapted to be clamped to the outer sides of said side pieces by nuts 24.

It will be obvious that by the construction just above described, said oblique rearwardly extending guards 20 may be raised or lowered a predetermined distance, as occasion may necessitate. The rear ends of said oblique cutting knives 8 may be adjusted at any desired distance apart, which adjustment is facilitated and permitted by reason of the outwardly extending threaded portions 10 of said adjusting hangers 9.

25 represents a combined draft tongue and guide hanger, which is secured to the under and upper faces of said cross bars 2 and 3, respectively, and is provided at its front end with a clevis 26, or other equivalent means, for the adjustment of draft means, and is preferably reduced at its rear end to provide a handle for guiding the machine.

Having described my invention, I claim:—

1. In a bean cutter, the combination of a frame, comprising side pieces connected near their front and rear ends by cross bars and having longitudinal recesses in their under edges near their front ends, longitudinal runners having upwardly extending bent portions corresponding in length with the recesses in said side pieces, secured to the under edges of the same, oblique cutting knives pivotally connected at their front ends to said longitudinal runners at their bent portions, adjusting hangers connected at their lower ends to the upper faces of said oblique cutting knives and having horizontal outwardly extended threaded portions adapted to work in vertical elongated slots in the side pieces of said frame, retaining knives vertically and adjustably secured to the outer sides and near the rear ends of the side pieces of said frame, their lower ends adapted to penetrate into the ground, and oblique rearwardly extending guards adjustably secured near their front ends near the front ends of said side pieces of said frame, substantially as described.

2. In a bean cutter, the combination of a frame having side pieces connected near their front and rear ends by cross pieces, longitudinal runners secured to the under edges of said side pieces, retaining knives adjustably secured near the rear ends of the side pieces of said frame, oblique cutting knives pivotally connected at their front ends to the under sides of said runners, means for supporting said cutting knives and for adjusting and holding their rear ends any desired distance apart, and oblique rearwardly extending guards adjustably secured near their front ends near the front ends of said side pieces of said frame.

3. In a bean cutter, the combination of a frame, comprising side pieces connected by cross bars and having longitudinal recesses in their under edges, runners secured to the under edges of the side pieces of said frame and having upwardly extending bent portions corresponding in length with and adapted to fit in the recesses of the same, and oblique cutting knives pivotally connected to the under faces and at the bent portions of said runners at their front ends, and adjustably connected at their rear ends to said side pieces.

4. In a bean cutter, the combination of a frame, having side pieces, runners secured to the under edges of said side pieces, oblique cutting blades pivotally connected near their front ends to said runners, and means for adjustably supporting the rear ends of said cutting knives.

5. In a bean cutter, the combination of a frame having side pieces having longitudinal recesses in their under edges, longitudinal runners having upwardly extending bent portions, corresponding in length with and adapted to fit in the recesses of said side pieces, oblique cutting knives pivotally connected at their front ends to the upwardly extending bent portions of said runners, and adjusting hangers connected at their lower ends to said cutting knives and having horizontal outwardly extending threaded portions adapted to work in vertical elongated slots in said frame, with means screwed on the threaded portions of said hangers for holding them in position, substantially as described.

6. In a bean cutter, the combination of a frame, comprising side pieces connected by cross bars, runners secured to the under edges of the side pieces of said frame, oblique cutting knives pivotally connected near their ends to said runners, means for supporting and for adjusting the rear ends of said cutting knives either vertically or laterally, and oblique guards adjustably secured to the side pieces of said frame.

7. In a bean cutter, the combination of a frame, having side pieces, retaining knives vertically and adjustably secured near the rear ends of said side pieces, runners secured to the lower edges of said side pieces, and oblique cutting knives pivotally connected near their front ends to said runners, with means for supporting and adjusting the rear ends of said knives either vertically or laterally.

8. In a bean cutter, the combination of a frame comprising side pieces connected by cross bars and having longitudinal recesses in their under edges, and runners secured to the under edges of said side pieces of said frame, and having upwardly extending bent portions corresponding in length and adapted to fit in the recesses of the same, substantially as described.

In testimony whereof I have hereunto set my hand in presence of two subscribing witnesses.

JOHN WESLEY BROWN.

Witnesses:
  G. A. JOHN,
  ADAM BAIR.